United States Patent
Lee et al.

(10) Patent No.: US 9,516,588 B2
(45) Date of Patent: Dec. 6, 2016

(54) METHOD OF SELECTING A CELL IN A WIRELESS COMMUNICATION SYSTEM AND APPARATUS THEREFOR

(71) Applicant: LG Electronics Inc., Seoul (KR)

(72) Inventors: Jaewook Lee, Gyeonggi-do (KR); Youngdae Lee, Gyeonggi-do (KR); Sunghoon Jung, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 168 days.

(21) Appl. No.: 14/391,068

(22) PCT Filed: Apr. 18, 2013

(86) PCT No.: PCT/KR2013/003291
§ 371 (c)(1),
(2) Date: Oct. 7, 2014

(87) PCT Pub. No.: WO2013/168906
PCT Pub. Date: Nov. 14, 2013

(65) Prior Publication Data
US 2015/0327162 A1    Nov. 12, 2015

Related U.S. Application Data (60) Provisional application No. 61/645,628, filed on May 11, 2012.

(51) Int. Cl.
*H04W 48/20*   (2009.01)
*H04W 24/08*   (2009.01)
*H04W 48/12*   (2009.01)

(52) U.S. Cl.
CPC ............ *H04W 48/20* (2013.01); *H04W 24/08* (2013.01); *H04W 48/12* (2013.01)

(58) Field of Classification Search
None
See application file for complete search history.

(56) References Cited

U.S. PATENT DOCUMENTS

| | | | |
|---|---|---|---|
| 5,394,433 A | 2/1995 | Bantz et al. | |
| 9,161,343 B2 * | 10/2015 | Koo | ................... H04W 72/1215 |
| 2012/0020229 A1 * | 1/2012 | Dayal | .................. H04W 16/14 |
| | | | 370/252 |
| 2012/0182896 A1 * | 7/2012 | Jang | ...................... H04W 24/10 |
| | | | 370/252 |

(Continued)

OTHER PUBLICATIONS

International Search Report and Written Opinion issued in corresponding International Patent Application No. PCT/KR2013/003291 dated Aug. 30, 2013.

(Continued)

*Primary Examiner* — Brian Roberts
(74) *Attorney, Agent, or Firm* — Morgan, Lewis & Bockius LLP (57) ABSTRACT

The present invention discloses a method of performing a cell selection at a first communication module of a user equipment in a wireless communication system. Specifically, the method includes receiving offset information from a network, measuring a cell for the cell selection, and determining whether to select the measured cell by applying the offset information to a measurement result, if a frequency on the measured cell is an unusable frequency.

9 Claims, 8 Drawing Sheets

(56) References Cited

U.S. PATENT DOCUMENTS

| | | | |
|---|---|---|---|
| 2012/0195298 A1* | 8/2012 | Kuo | H04W 4/06 370/338 |
| 2012/0207040 A1* | 8/2012 | Comsa | H04W 72/1215 370/252 |
| 2013/0010766 A1* | 1/2013 | Sadek | H04W 72/1215 370/336 |
| 2013/0029704 A1* | 1/2013 | Koo | H04W 72/1215 455/501 |

OTHER PUBLICATIONS

Chang et al., "PN Offset Planning Strategies for Non-Uniform CDMA Networks," IEEE, 1543-1547 (1997).

\* cited by examiner

(a) Control-plane protocol stack (b) User-plane protocol stack

METHOD OF SELECTING A CELL IN A WIRELESS COMMUNICATION SYSTEM AND APPARATUS THEREFOR

TECHNICAL FIELD

The present invention relates to a wireless communication system, and more particularly, to a method of selecting a cell in a wireless communication system in consideration of an IDC (In-Device Coexistence) interference and apparatus therefor.

BACKGROUND ART

3GPP LTE ($3^{rd}$ generation partnership project long term evolution) communication system is schematically explained as an example of a wireless communication system to which the present invention is applicable.

Figure 1:
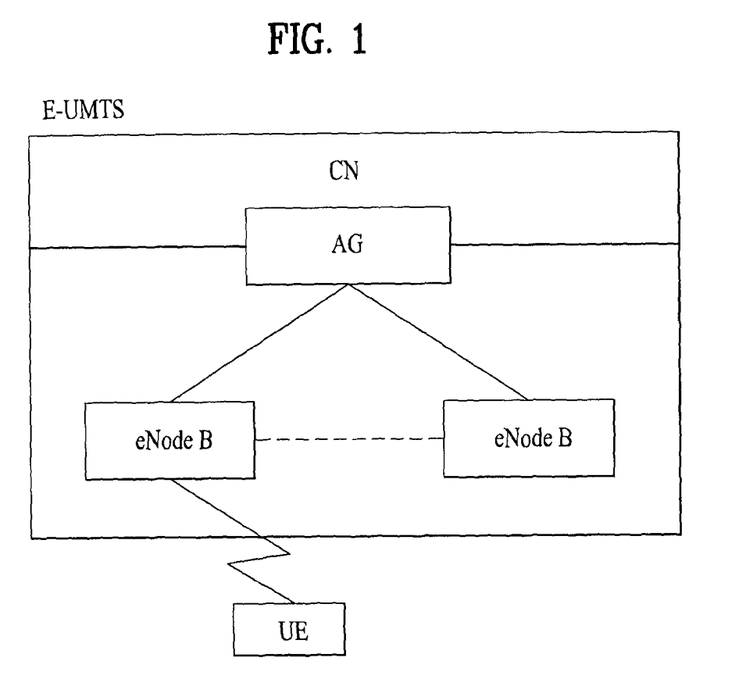
FIG. 1 is a schematic diagram of E-UMTS network structure as one example of a wireless communication system.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general.

Detailed contents for the technical specifications of UMTS and E-UMTS refers to release 7 and release 8 of "$3^{rd}$ generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

Accordingly, an object of the present invention is to provide a method of selecting a cell in a wireless communication system in consideration of an IDC interference and apparatus therefore.

Technical Solution

To achieve these and other advantages and in accordance with the purpose of the present invention, as embodied and broadly described, according to one embodiment of the present invention a method of performing a cell selection at a first communication module of a user equipment in a wireless communication system includes steps of receiving offset information from a network, measuring a cell for the cell selection, and determining whether to select the measured cell by applying the offset information to a measurement result, if a frequency on the measured cell is an unusable frequency. And, the method is further comprises a step of determining whether to select the measured cell by not applying the offset information to the measurement result, if the frequency on the measured cell is not the unusable frequency.

Preferably, if the measured cell is selected, the method further includes a step of establishing a connection with the measured cell.

And, the offset information includes an offset value to subtract from the measurement result and the measurement result includes at least one of a reception power level for the cell selection and a cell quality value for the cell selection. In this case, the step of determining whether to select the measured cell comprises a step of selecting the measured cell if a value of subtracting the offset value from the measurement result is greater than 0.

Meanwhile, to further achieve these and other advantages and in accordance with the purpose of the present invention, according to a different embodiment a method of performing a cell selection at a first communication module of a user equipment in a wireless communication system includes steps of measuring one or more cells for the cell selection except for at least one cell on an unusable frequency and determining whether to select the measured one or more cells according to a measurement result. The method further includes a step of receiving, from a network, information on whether to exclude the at least one cell on the unusable frequency. And, if a cell is selected from the measured one or more cells, establishing a connection with the selected cell.

In the aforementioned embodiments, the unusable frequency is a frequency occurring an IDC (In-Device Coexistence) interference due to one or more second communication modules coexisting in the user equipment. The one or more second communication modules comprise at least one of a transceiving module for a WiFi system, a transceiving module for a Bluetooth and a receiving module for a GPS (Global positioning System).

Advantageous Effects

According to the aforementioned embodiments of the present invention, a user equipment may be able to more efficiently perform a cell selection in consideration of IDC interference.

Effects obtainable from the present invention may be non-limited by the above mentioned effect. And, other unmentioned effects can be clearly understood from the following description by those having ordinary skill in the technical field to which the present invention pertains.

MODE FOR INVENTION

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In the present specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention can also be applied to H-FDD or TDD in a manner of easily being modified.

Figure 2:
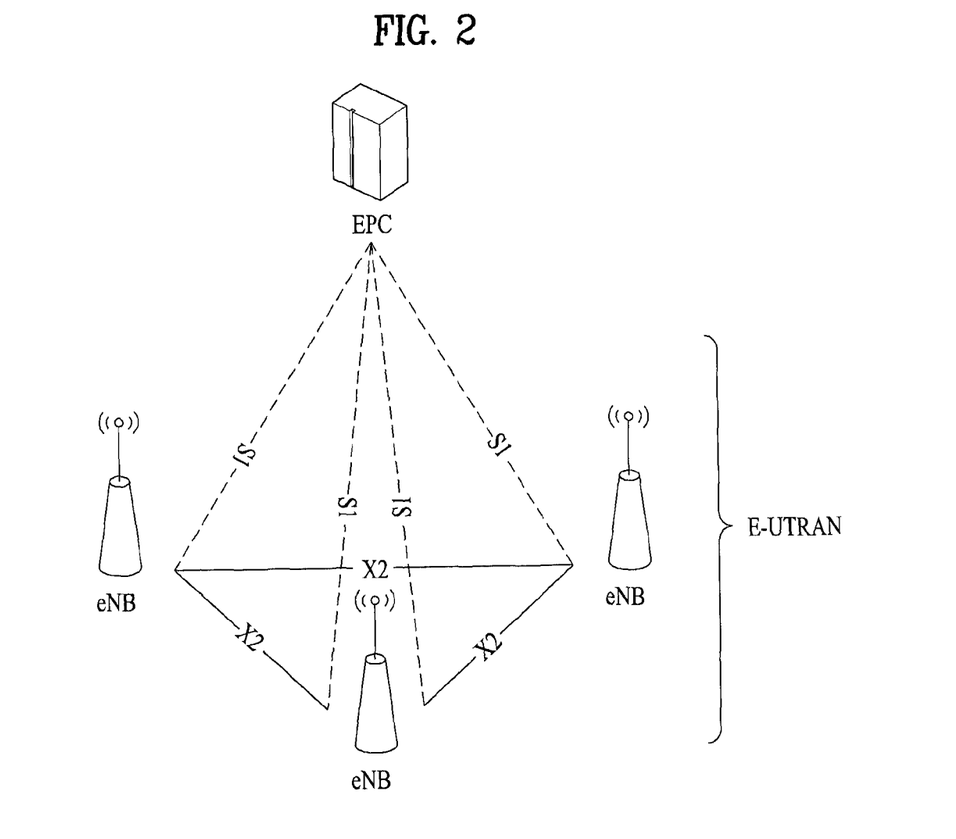
FIG. 2 is a conceptual diagram of E-UTRAN (evolved universal terrestrial radio access network) network structure.

FIG. 2 is a conceptual diagram of E-UTRAN (evolved universal terrestrial radio access network) network structure. In particular, the E-UTRAN system is a system evolved from a conventional UTRAN system. The E-UTRAN consists of cells (eNBs) and the cells are connected to each other via X2 interface. A cell is connected to a user equipment via a radio interface and is connected to EPC (evolved packet core) through S1 interface.

The EPC includes MME (mobility management entity), S-GW (serving-gateway) and PDN-GW (packet data network-gateway). The MME has an access information of a user equipment or information on a capability of a user equipment. This information is mainly used for a mobility management of user equipment. The S-GW is a gateway having E-UTRAN as an end point. The PDN-GW is a gateway having PDN (packet data network) as an end point.

Figure 3:
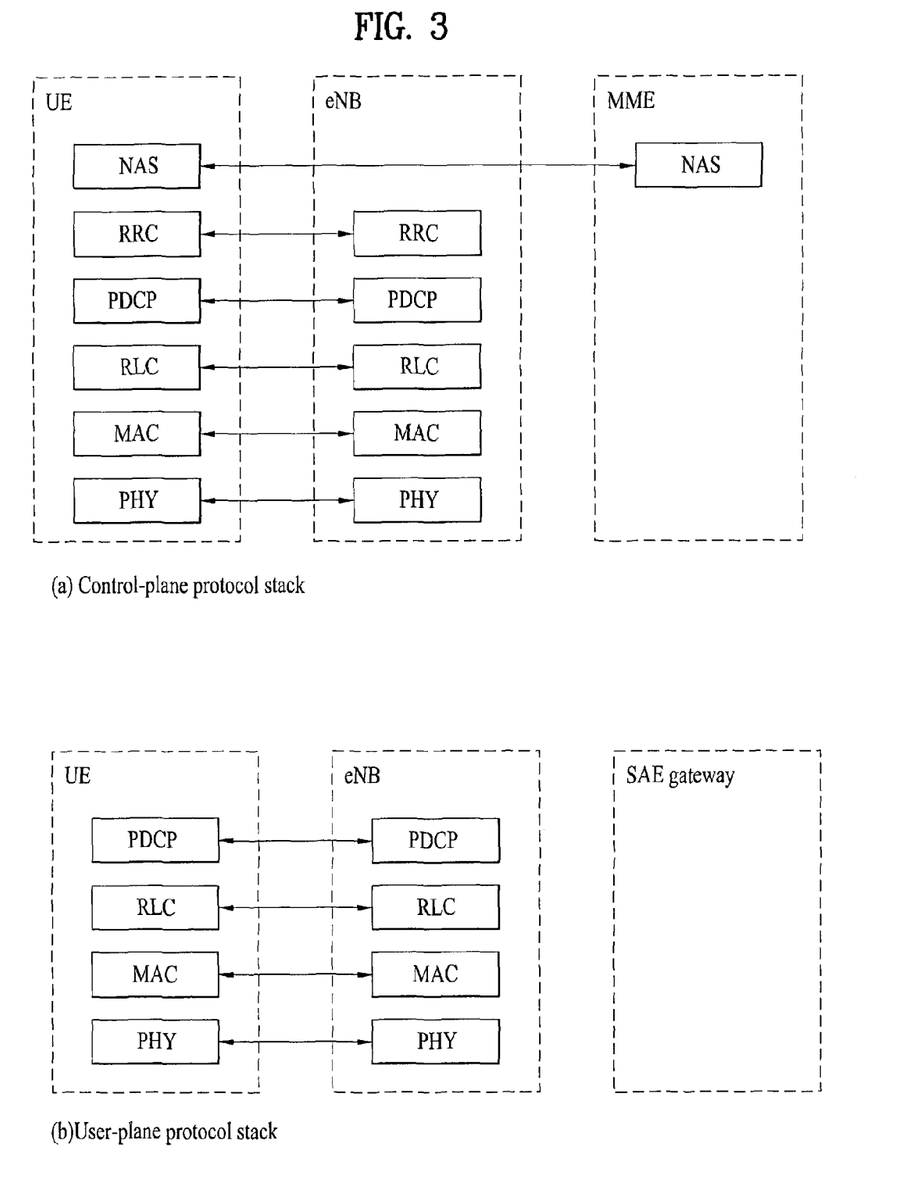
FIG. 3 is a diagram for structures of control and user planes of radio interface protocol between a 3GPP radio access network standard-based user equipment and E-UTRAN.

FIG. 3 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a first layer, provides higher layers with an information transfer service using a physical channel. The physical layer is connected to a medium access control layer situated above via a transport channel. Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a second layer provides a service to a radio link control (hereinafter abbreviated RLC) layer, which is a higher layer, on a logical channel. The RLC layer of the second layer supports a reliable data transmission. The function of the RLC layer may be implemented by a function block within the MAC. PDCP (packet data convergence protocol) layer of the second layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a third layer is defined on a control plane only. The RRC layer is responsible for the control of logical channels, transport channels and physical channels in association with a configuration, a re-configuration and a release of radio bearers (hereinafter abbreviated RBs). The RB indicates a service provided by the second layer for a data delivery between the user equipment and the network. To this end, the RRC layer of the user equipment and the RRC layer of the network exchange a RRC message with each other.

A single cell consisting of an eNode B is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel).

Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

In the following description, an RRC state of a user equipment and an RRC connecting method are explained. First of all, the RRC state may indicate whether the RRC of the user equipment is logically connected to the RRC of the E-UTRAN. If the RRCs are logically connected together, such a state can be named 'RRC_CONNECTED state'. Otherwise, such a state can be named 'RRC_IDLE state'.

Since E-UTRAN is able to recognize an existence of user equipment in the RRC_CONNECTED state by cell unit, the E-UTRAN is able to effectively control the corresponding user equipment. On the other hand, the E-UTRAN is unable to recognize the user equipment in the RRC_IDLE state by the cell unit. Hence, core network (CN) may manage the user equipment in the RRC_IDLE state by tracking area (TA) unit, which is a unit of area larger than a cell. Therefore, in order for the user equipment in RRC_IDLE state to receive such a service as a voice service, a data service from the cell, the corresponding user equipment should make a transition to the RRC_CONNECTED state.

In particular, when a user initially turns the power on of a user equipment, the user equipment searches for an appropriate cell and then stays in RRC_IDLE state in the corresponding found cell. If the user equipment staying in the RRC_IDLE state needs to establish an RRC connection, the user equipment establishes the RRC connection with an RRC of E-UTRAN and then makes a transition to RRC_CONNECTED state. In this case, a case of establishing an RRC connection may include a case that an uplink data transmission is required due to such a reason as a user's call attempt and the like, a case that a response message needs to be sent in response to a reception of a paging message from the E-UTRAN, or the like.

The user equipment staying in the RRC_IDLE state consistently performs a cell reselection to search for a better cell. In this case, the user equipment performs a measurement and the cell reselection using a frequency priority information. In particular, in case of performing a frequency measurement and a cell reselection, which shall be described later, the user equipment determines which frequency is to be preferentially considered based on the frequency priority information. The user equipment may be able to receive the frequency priority information via a system information or an RRC connection release message. Or, the user equipment may be able to receive the priority information via a different RAT in case of (re)selecting an inter-RAT cell, which shall be discussed later.

Figure 4:
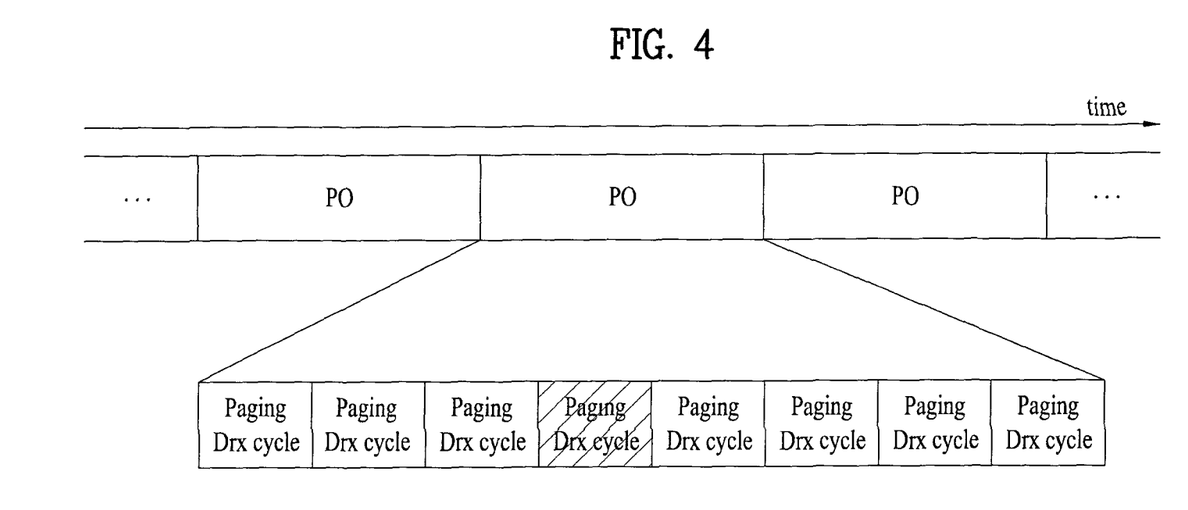
FIG. 4 is a diagram for explaining a general transceiving method using a paging message.

FIG. 4 is a diagram for explaining a general transceiving method using a paging message.

Referring to FIG. 4, a paging message includes a paging record consisting of a paging cause, a user equipment identity and the like. When the paging message is received, a user equipment may be able to perform a discontinuous reception (DRX) cycle for the purpose of power consumption reduction.

Specifically, a network may configure a plurality of paging occasions (PO) on every time cycle, which is called a paging cycle (paging DRX cycle). And, the network enables a specific user equipment to obtain a paging message by receiving a specific paging occasion only. The user equipment does not receive any paging channel except the corresponding specific paging occasion and may stay in an idle state to reduce power consumption. One paging occasion corresponds to one TTI (transmission time interval).

An eNode B and a user equipment use a paging indicator (hereinafter abbreviated PI) as a specific value for indicating a transmission of a paging message. The eNode B may define a specific identifier (e.g., paging-radio network temporary identity (P-RNTI)) with the purpose of PI usage and then may be able to inform the user equipment of a transmission of a paging information. For instance, the user equipment wakes up on every DRX cycle and then receives one subframe to know whether a paging message has appeared. If the P-RNTI exists on a L1/L2 control channel (PDCCH) of the received subframe, the user equipment may be able to know that a paging message exists on a PDSCH of the corresponding subframe. And, if the paging message includes a user equipment identifier (e.g., IMSI) of the user equipment, the user equipment may be able to receive a service in response to the eNode B (e.g., RRC connection or system information reception).

Meanwhile, a service provided to a user equipment by a network can be classified into 3 types. The user equipment differently recognizes the type of cell depending on which service can be received. Meanwhile, the service provided to the user equipment by the network is classified into 3 types by the 3GPP standard document as shown in Table 1 as follows.

TABLE 1

| Limited service | Provides emergency call and ETWS (Earthquake and Tsunami Warning System) |
| Normal service | Provides a public use service of general purpose |
| Operator service | Provides a service for a communication network service provider |

And, the type of cell is divided into as shown in the following Table 2 by the 3GPP standard document in relation to the service type provided to a user equipment by a cell.

TABLE 2

| Acceptable cell | Cell capable of receiving limited service by a UE |
| Suitable cell | Cell capable of receiving normal service by a UE |
| Barred cell | Cell designated as a barred cell in system information |
| Reserved cell | Cell designated as a reserved cell in system information |

In this case, the acceptable cell corresponds to a cell not barred and satisfying a cell selection criterion of a user equipment from the point of view of the user equipment. The acceptable cell is a cell capable of being provided with such a limited service only as an emergency call and ETWS.

And, the suitable cell satisfies the condition of the acceptable cell and simultaneously satisfies additional conditions as well. The additional conditions may indicate that the cell should belong to PLMN to which a corresponding user equipment can access and the cell not prohibiting a user equipment from performing a TA update procedure. If the cell corresponds to a CSG (Closed Subscriber Group) cell, it should be available for the user equipment to access the cell as a CSG member.

In order for a user equipment to receive a service from a cell, the user equipment performs a cell selection procedure and registers the user equipment in a network. And, if strength or quality of a signal between the user equipment and the cell is degraded due to a mobility of the user equipment, the user equipment performs a cell reselection procedure to maintain transmission quality of data.

A cell selection procedure is classified into two kinds in 3GPP standard document as follows.

A first procedure of the cell selection corresponds to an initial cell selection procedure. This procedure is performed in case that a user equipment does not have an advance information on a radio channel. In this case, the user equipment searches for all radio channels to find out an appropriate cell and then selects a cell corresponding to a radio channel of strongest signal quality among the searched radio channels.

A second procedure of the cell selection corresponds to a cell selection procedure utilizing stored information. This procedure is performed in case that the user equipment is already stored the information on a radio channel. In this case, since the user equipment already has the information on the radio channel, a cell can be selected more quickly compared to the aforementioned initial cell selection procedure.

Cell selection criteria in an LTE system disclosed in 3GPP standard document is indicated by Equations 1 2 as follows.

$$Srxlev = Q_{rxlevmeas} - (Q_{rxlevmin} + Q_{rxlevminoffset}) - Pcompensation > 0 \quad \text{[Equation 1]}$$

$$Squal = Q_{qualmeas} - (Q_{qualmin} + Q_{qualminoffset}) > 0 \quad \text{[Equation 2]}$$

As shown in Table 3, parameters used for the Equation 1 and the Equation 2 are as follows.

TABLE 3

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ |
| $P_{PowerClass}$ | Maximum RF output power of the UE (dBm) according to the UE power class |

The user equipment receives the parameters in Table 3 via a system information (SI) and then performs a cell selection procedure using a cell selection criteria of the Equation 1 and the Equation 2.

Meanwhile, the aforementioned system information includes essential information for the user equipment to know to access a cell. Hence, before accessing the cell, the user equipment should have a latest system information. And, since the system information is the information of which all user equipments in one cell should be aware, the cell transmits the system information periodically.

The system information may be divided into a master information block (MIB), a scheduling block (SB), a system information block (SIB), and the like. The MIB enables a user equipment to know a physical configuration, e.g., bandwidth of a corresponding cell. The SIB is a set of system informations related to each other. For instance, a specific SIB contains information on a neighbor cell only and a different SIB contains information on an uplink radio channel used by the user equipment only. Transmission information (e.g., transmission periods, etc.) of the SIBs are indicated by the SB.

Meanwhile, after the user equipment has selected a specific cell through the cell selection procedure, a strength or quality of a signal between the user equipment and a cell may change due to a mobility of the user equipment, a change of a radio environment or the like. In case that the quality of the selected cell is degraded, the user equipment may be able to select a different cell providing a better quality. Thus, in case of selecting a cell again, the user equipment selects a cell providing a signal quality better than that of a currently selected cell in general. This procedure is called a cell reselection procedure.

In aspect of a quality of a radio signal, the basic object of the cell reselection procedure is to select a cell providing a best quality to the user equipment in general. Aside from the aspect of the quality of the radio signal, a network determines a priority per frequency and may then inform the user equipment of the determined priority. Having received this priority, the user equipment may preferentially consider the received priority in a cell reselection procedure other than a radio signal quality reference. As shown in Table 4, the aforementioned cell reselection procedure can be classified into an intra-frequency cell reselection, an inter-frequency cell reselection, and an inter-RAT cell reselection according to a radio access technology (RAT) and a frequency characteristic as follows.

TABLE 4

| | |
|---|---|
| Intra-frequency cell reselection | Reselecting a cell having a same RAT and a same center frequency with a serving cell |
| Inter-frequency cell reselection | Reselecting a cell having a same RAT and a different center frequency with a serving cell |
| Inter-RAT cell reselection | Reselecting a cell having a different RAT with a serving cell |

Figure 5:
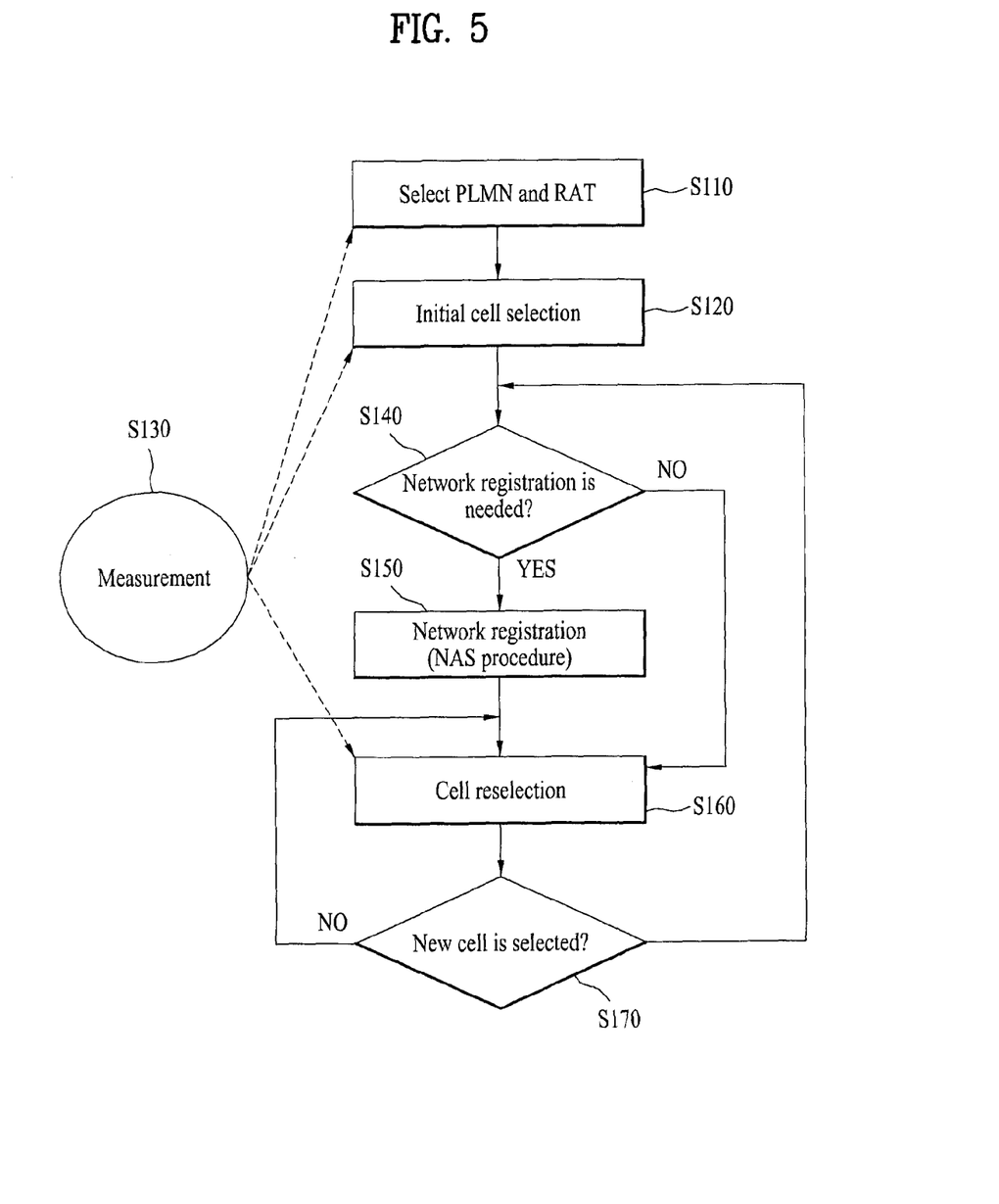
FIG. 5 is a flowchart of operations of a user equipment in case that the user equipment turns the power on in a LTE (Long Term Evolution) system.

FIG. 5 is a flowchart of operations of a user equipment in case that the user equipment turns the power on in a LTE (Long Term Evolution) system.

Referring to FIG. 5, when the power of a user equipment is turned on, the user equipment selects a PLMN (Public land mobile Network), which is a network from which the user equipment intends to receive a service, and a RAT (Radio Access Technology) to perform a communication in the step [S110]. Information on the PLMN and the RAT can be selected by a user of the user equipment or can use the information stored in a USIM (Universal Subscriber Identity Module). In this case, the user equipment measures a signal, i.e., a reference signal or a pilot signal transmitted periodically or aperiodically from a cell in the step S130 and then calculates cell quality information using strength of the signal or a characteristic of a physical signal related to a ratio of signal and noise to interference.

Thereafter, the user equipment performs a cell selection process selecting a cell having a greatest value among the cell having the measured cell quality information greater than a reference value in the step [S120]. The reference value indicates a value defined by a system to secure the quality for a physical signal in a data transmission and reception. Hence, the reference value may vary according to the RAT applied thereto and can be obtained by the Equation 1 in LTE system.

Thereafter, the user equipment receives system information periodically transmitted by the cell and then registers the information on the user equipment (e.g., International Mobile Subscriber Identity (IMSI)) in a network to receive a service from the network using the system information in the step [S150]. The user equipment does not register in the network on every cell selection. The user equipment registers in the network in case that the information on the network received from the SI (e.g., tracking area identity (TAI)) is different from the information on the network of which the user equipment is aware as shown in the steps [S140] and [S170].

And, if the strength or quality of a signal measured in a cell of a serving cell is lower than a value measured in a cell of a neighbor cell, the user equipment reselects one cell among different cells providing a better signal characteristic compared to the cell to which the user equipment accessed in the step [S160]. This process is called a cell reselection distinguished by the cell selection in the step [S120]. In this case, in order to prevent a cell from frequently being reselected according to a change of the signal characteristic, a time constraint (e.g., a cell selection timer) can be configured.

In the following description, measurement and a measurement reporting are explained.

In the following description, a terminology of 'measurement' may be defined as to measure a quality value of a corresponding cell by receiving a reference signal received from cells situated at an inter-frequency, an intra-frequency, and an inter-RAT according to a measurement configuration received from a network by a user equipment. And, a terminology of 'quality' means to indicate the signal quality or the cell quality identified by the reference signal received from a measurement target cell in the following description.

In relation to a mobility of a user equipment in a mobile communication system, the user equipment consistently measures quality of a serving cell currently providing a service and the quality of a neighbor cell. The user equipment reports a measurement result for cell quality to a network in an appropriate time and the network provides the user equipment with optimum mobility via a handover and the like. To this end, the network can configure the user equipment with information related to the measurement and the measurement reporting as follows.

1) Measurement Object

This indicates an object for which the user equipment should measure. The measurement object can be mainly classified into 3 kinds according to the object to be measured. The 3 kinds include a measurement for an intra-frequency having a same center frequency with the center frequency of a serving cell, the measurement for an inter-frequency having a center frequency different from the center frequency of the serving cell, and the measurement for an inter-RAT measurement. The inter-RAT may include UTRAN (UMTS Terrestrial Radio Access Network) and GERAN (GSM EDGE Radio Access Network) following 3GPP standard and CDMA 2000 following 3GPP2 standard.

2) Reporting Configuration

Reporting configuration includes a reporting criterion indicating that a reporting is performed when a prescribed criterion is satisfied and a reporting format indicating that the content of the reporting when a reporting is practically performed. Specifically, the reporting criterion includes an event-based trigger type and a cycle-based trigger type. The event-based trigger type is to report a measurement result in case that a preset specific condition is satisfied. The cycle-based trigger type is to report by a user equipment if a predetermined time elapses after a base station performed an initial report when a required information is obtained by the user equipment.

The event-based trigger type includes A1 (measurement result of a serving cell is better than a threshold value), A2 (measurement result of a serving cell is worse than a threshold value), A3 (measurement result of a neighbor cell is better than measurement result of Pcell as much as an offset), A4 (measurement result of a neighbor cell is better than a threshold value), A5 (measurement result of Pcell is worse than a first threshold value and measurement result of a neighbor cell is better than a second threshold value), A6 (measurement result of a neighbor cell is better than measurement result of Scell as much as an offset), B1 (measurement result of inter-RAT cell is better than a threshold value), and B2 (measurement result of Pcell is worse than a first threshold value and measurement result of inter-RAT cell is better than a second threshold value) cases.

3) Measurement Identity

The measurement identity is a connector connecting the aforementioned measurement object and the reporting configuration with each other.

4) Quantity Configuration

A user equipment performs a filtering on a measured result and then collects a corresponding result. The quantity configuration corresponds to information on the filtering.

5) Measuring Gap

The measuring gap is a section permitting a user equipment to measure. In this section, uplink and downlink data transmission are not performed.

In the following description, IDC (In-Device coexistence) and IDC interference are explained.

In order for a user to access various networks anywhere and at any time, it is necessary for a user equipment to be equipped with a GNSS (Global Navigation Satellite System) receiver as well as a transceiver for such a wireless communication system as LTE, WiFi, Bluetooth (BT), and the like. As mentioned in the foregoing description, wireless communication systems different from each other coexisting in a single user equipment is called IDC (In-Device Coexistence). Examples of the IDC may include a user equipment equipped with LTE and BT module to receive a VoIP service and a multimedia service using a BT earphones, a user equipment equipped with LTE and WiFi module to disperse a traffic, a user equipment equipped with GNSS and LTE module to additionally obtain a location information, and the like.

Figure 6:
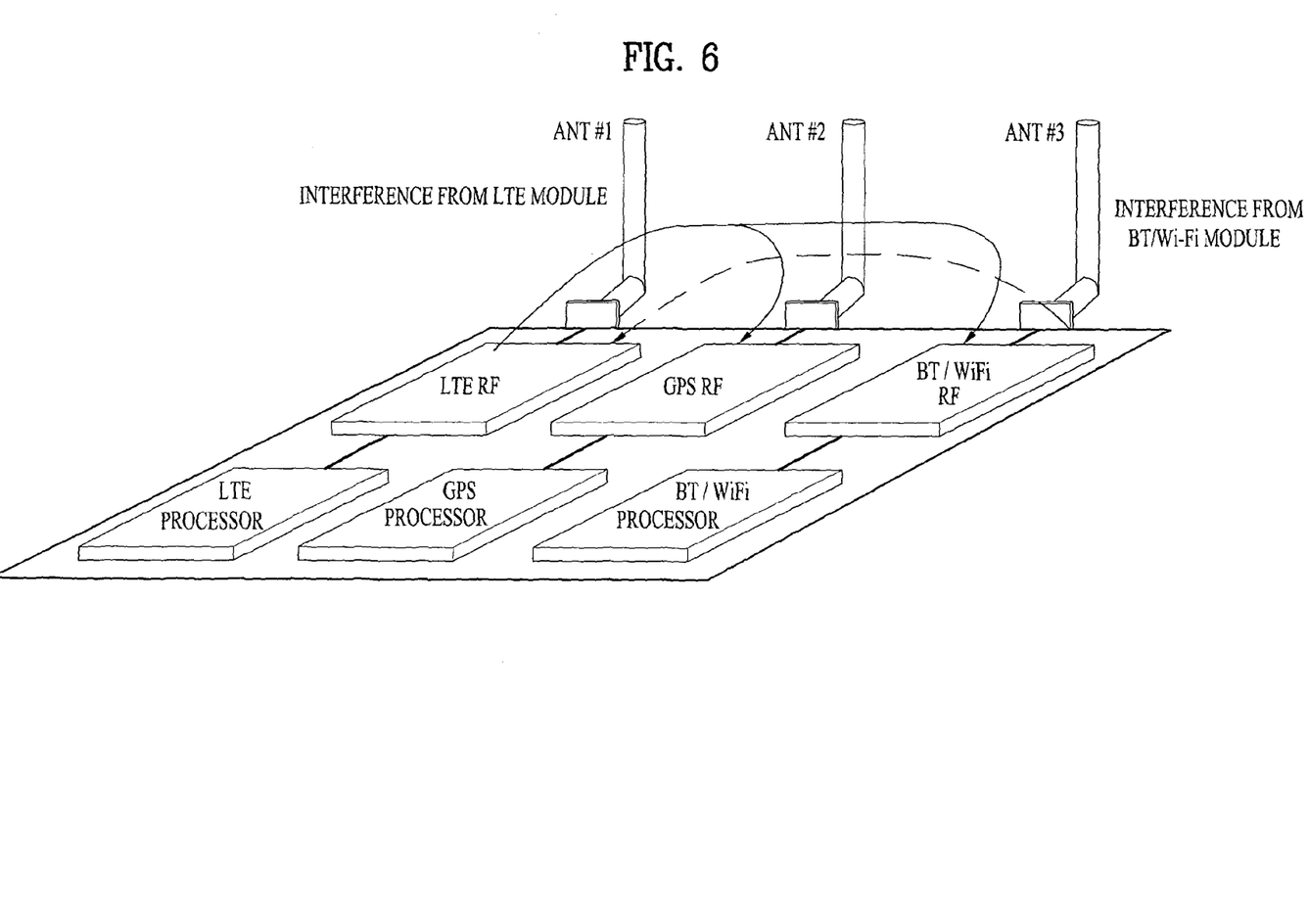
FIG. 6 is an example of an user equipment including radio communication modules for an LTE system, a GPS (Global Positioning System), and a BT/WiFi system, respectively.

FIG. 6 is an example of a user equipment including radio communication modules for an LTE system, a GPS (Global Positioning System), and a BT/WiFi system, respectively.

Referring to FIG. 6, in case of the aforementioned user equipment, since many transceivers are close to each other in one user equipment, power of a signal transmitted from a transmitter may be higher than the power of a signal received by a different receiver. In this case, interference can occur between different communication modules and this is called IDC interference. In case that the IDC interference becomes severe, a ping-pong phenomenon, continuously attempting a handover, may occur although there exists no problem in connecting to an eNode B.

In general, the aforementioned communication modules may give interference to each other in a manner of operating in an adjacent frequency in terms of a frequency as follows.

The LTE module operates in a TDD Band 40 (2300 MHz~2400 MHz) and the WiFi module or the Bluetooth module may operate in 2400 MHz~2483.5 MHz, which an unlicensed band. In this case, the LTE module may interfere in the WiFi module or the Bluetooth module. Transmission from the WiFi module or the Bluetooth module may interfere in a reception of the LTE module.

And, The LTE module performs an uplink transmission in a FDD Band 7 (2500 MHz~2700 MHz) and the Bluetooth module may operate in 2400 MHz~2483.5 MHz, which an unlicensed band. In this case, the uplink transmission from the LTE module may interfere in the reception of the WiFi module or the Bluetooth module.

And, The LTE module operates in a FDD Band 13 (UL: 777-787 MHz, DL: 746-756 MHz) or a FDD Band 14 (UL: 788-798 MHz, DL: 758-768 MHz) and the GPS module may be able to receive a location information in 1575.42 MHz. In this case, an uplink transmission from the LTE module may interfere in the reception of the location information of the GPS module.

As one solution for the problems, occurrence of IDC interference between two transceivers can be avoided by sufficiently securing a space between physical filters or in a frequency between each transmitting and receiving signal. Yet, in case that many wireless communication modules operate in an adjacent frequency, it is hardly expected that a current filter technology is able to sufficiently suppress the interference.

Aside from a method of applying a physical filter scheme, IDC interference avoidance scheme can be considered for 3 cases as follows according to whether there exists coordination between the LTE module and other communication modules coexisting with the LTE module and whether there exists coordination between the LTE module and an eNode B to eliminate the IDC interference.

A first case is a case that there is no coordination to avoid the IDC interference between communication modules coexisting in one user equipment and between the LTE module and the eNode B. In this case, the LTE module does not know the information on other communication modules coexisting with the LTE module.

A second case is a case that there exists coordination between the communication modules coexisting inside of the user equipment only. In this case, it may be able to know an operation state (i.e., ON/OFF state) between the modules coexisting in the user equipment, traffic transmission state, and the like.

The last case is a case that there exists coordination between the user equipment and the eNode B as well as between the modules coexisting inside of the user equipment. The LTE module may be able to measure the IDC interference by measuring inter/intra frequency as well as to coordinate with other modules.

Currently, 3GPP considers 1) a method of changing a frequency by an interfering communication module or an interfered communication module (Frequency Division Multiplexing; FDM), 2) a method of using one frequency by coexisting communication modules in a manner of dividing time (Time Division Multiplexing; TDM), and 3) a method of reducing interference affecting coexisting modules in a manner of controlling a transmit power by the LTE module (LTE power control; LTE PC) to solve the IDC interference. Detail methods and procedures are currently under discussion by 3GPP.

In order for the aforementioned IDC interference control method to efficiently operate, cooperation of a network is necessary. In particular, in order to avoid the IDC interference, such a cooperation as a handover moving a currently using frequency to a different frequency, a scheduling of an eNode B to use a time resource in a manner of dividing the time resource, and the like are necessary. Since the IDC interference is a problem occurred in one user equipment, it is difficult for an eNode B to know the IDC interference. Hence, in case of occurrence of the IDC interference or in case of existing a possibility of occurrence of the IDC interference, the user equipment transmits the IDC interference information to the eNode B. And, in case that the IDC interference perished, the user equipment should transmit the IDC interference information to the eNode B as well.

Yet, in case that occurrence and perishing of the IDC interference consistently occur, since the user equipment should transmit all information related to the IDC interference to the eNode B, this may become a signal overhead.

In order to solve the aforementioned problem, a method of reducing interference, which affects other coexisting modules, in a manner of controlling a transmit power by the LTE module is mainly discussed in the present invention. In particular, in order to avoid the IDC interference, first of all, the LTE module calculates quantity of uplink power, which should be controlled (i.e., reduced). In case that the quantity of uplink power required to be reduced deviates a threshold value, the present invention proposes a scheme to transmit the IDC interference information to the eNode B. And, according to the present invention, in case that the quantity of uplink transmit power control, which is necessary to control the IDC interference affecting other communication modules, is less than a prescribed range, the LTE module may be able to lower the uplink transmit power by itself.

The IDC interference corresponds to a case that interference occurs in a reception of other communication modules due to the uplink transmission of the LTE module. Whether the IDC interference affecting other communication modules is started and the extent of the interference can be identified by the LTE module via an internal coordination of the user equipment.

Meanwhile, the LTE module may be able to perform a power control by the following two kinds of methods. 1) If the quantity of power needed to be controlled is less than a threshold value, the user equipment controls an uplink transmit power by itself. 2) If the quantity of power needed to be controlled is greater than a threshold value, the user equipment controls the uplink transmit power as much as the threshold value and may be then able to transmit the IDC interference information. Or, it may be able to implement the LTE module to directly transmit the IDC interference information without controlling the uplink transmit power.

And, the threshold value can be configured by an eNode B via a UE-specific signaling. For instance, the eNode B may be able to signal by using a parameter 'dl-Pathloss-Change', which is the parameter used for triggering a legacy Power Headroom Reporting (PHR), or by defining a new value for an IDC situation. Or, it may be able to consider a method of steadily using the value defined by 3GPP standard document as the threshold value as well. For instance, the aforementioned P-MPR value can be used for the threshold value to transmit the IDC interference information.

And, the IDC interference information may be able to include the information on the quantity of uplink transmit power needed to be controlled or the information on the quantity of uplink transmit power needed to be additionally controlled in a manner of reducing after controlling the uplink transmit power to the threshold value. Moreover, it is preferable that the IDC interference information includes the information on which modules are coexisting with the LTE module as well.

More preferably, the IDC interference information may be able to include the information to avoid IDC interference in a manner of not a power control but a FDM/TDM scheme together with the information on the quantity of uplink transmit power to be controlled or individually. This is helpful information in case that the IDC interference needs to be avoided with a different scheme since it is impossible to perform a power control above the threshold value. For instance, the IDC interference information may include unusable frequency information necessary for the FDM scheme. And, the IDC interference information may be able to include pattern information on an interfering subframe or an interfered subframe necessary for the TDM scheme and subframe pattern information and the like necessary for a user equipment to avoid the IDC interference.

As mentioned in the foregoing description, when the IDC interference occurs, the user equipment may be able to transmit the IDC interference information, which is a message to inform a network of an interference situation, or an IDC indicator message. Yet, if the network does not permit the user equipment to transmit the corresponding message, the user equipment does not have any method to inform the network of the occurred IDC interference. There is no way to avoid the IDC interference except a method of turning off the power of one communication module. In this case, the user equipment may experience (1) to (3) as follows.

(1) Successful Inter-Frequency Handover

The user equipment has performed a measuring in a different frequency except the frequency in which the interference has occurred. Since cell quality of the measured frequency is excellent, the user equipment is able to successfully perform a handover to the corresponding frequency.

(2) Successful RRC Connection Reestablishment after RLF (Radio Link Failure)

After failing to make a handover, the user equipment may be able to successfully reestablish an RRC connection in a corresponding cell in a manner of successfully measuring and selecting a cell in a shorter time in an RRC connection reestablishment process.

(3) In the Process Mentioned in the (2), the User Equipment May Select a Cell of the Frequency Having the IDC Interference and the RRC Connection Reestablishment Process May Fail in the Corresponding Cell.

In case of the aforementioned (1) and the (2), a service can be maintained without a considerable falling-off in QoS (Quality of Service) of the user equipment in a relatively short period of time. Yet, in case of the (3), the service quality of the user equipment can be considerably degraded. It is necessary to improve the cell selection process of the user equipment to prevent the service quality degradation.

Hence, the present invention proposes a method to avoid selecting a cell of a specific frequency, which is affected by the IDC interference, in a cell selection process to efficiently perform a cell selection. In the following description, in case that the reception of the different communication modules is affected by the LTE module with more than a certain amount of interference or in case that the reception of the LTE module is affected by the different communication modules with more than a certain amount of interference in the coexisting situation, the user equipment judges the corresponding frequency as an unusable frequency.

First Embodiment

The first embodiment corresponds to a method for the user equipment to avoid selecting a cell on the unusable frequency in the cell selection process. Specifically, the user equipment in RRC_CONNECTED state or the user equipment in RRC_IDLE state does not perform a measurement for the unusable frequency in the cell selection process based on the information on the unusable frequency identified before the cell selection process. The user equipment may be aware of the frequency as the unusable frequency based on the information previously measured or a different module may be able to inform the user equipment of the information on the unusable frequency.

More specifically, the user equipment performing an initial cell selection performs a scanning or a measurement for frequencies except the unusable frequency according to the capability of the user equipment in an E-UTRA band to search for a suitable cell. In particular, the user equipment does not perform a measurement for the unusable frequency in the cell selection process.

In case of selecting a cell using stored information, the user equipment performs a scanning or measurement for the frequencies except the unusable frequency among the stored information. In particular, although the information on the unusable frequency is included in the stored information, the user equipment does not perform the measurement for the unusable frequency to select a cell.

Additionally, a network may be able to broadcast whether a measurement for the unusable frequency is performed to select a cell. In particular, the network may be able to broadcast whether the aforementioned operation is triggered. If the network broadcasts an indicator indicating that a measurement for the unusable frequency is not permitted, the user equipment receives the corresponding broadcast information and then does not measure for the unusable frequency in case of performing a measurement to select a cell.

On the contrary, if the network broadcasts an indicator indicating that a measurement for the unusable frequency is permitted or does not broadcast any related value, the user equipment performs a measurement in a manner of including the unusable frequency in case of performing a measurement to select a cell.

Of course, in this case, the unusable frequency can be excluded irrespective of a measurement result value when a cell reselection is performed. In particular, in a manner of not considering the unusable frequency or a cell on the unusable frequency as a candidate frequency or a candidate cell for the cell reselection in the cell reselection process as well, the user equipment may be able to exclude the unusable frequency irrespective of the measurement result value.

Second Embodiment

The second embodiment proposes that the user equipment judges whether a cell is selected or not using a special offset value informed by a network when a cell selection is performed.

Specifically, the network transmits an offset value for the unusable frequency to the user equipment. In case that a cell measured in a cell selection process corresponds to the cell of a frequency interfered by an IDC, the user equipment judges whether the cell is selected using a prescribed offset value in a cell selection criteria. This is because, it is preferable to judge whether to select a cell in a manner of subtracting a prescribed offset value from a measurement result value in case of the unusable frequency, since even the unusable frequency may have an excellent received power and reception quality according to a measurement timing. The unusable frequency does not always have a poor measurement result.

More specifically, among the prescribed offset values, the offset value for Srxlev is defined by $Q_{unusable\_offset1}$ and the offset value for Squal is defined by $Q_{unusable\_offset2}$. These offset values may be broadcasted for the user equipment in RRC_IDLE state and can be delivered to the user equipment in RRC_CONNECTED state via a dedicated signaling.

A criteria for a cell selection to which the offset value is reflected can be represented as Equations 3 and 4 as follows.

$$Srxlev = Q_{rxlevmeas} - (Q_{rxlevmin} + Q_{rxlevminoffset}) - Pcompensation - Q_{unusable\_offset1} > 0 \quad \text{[Equation 3]}$$

$$Squal = Q_{qualmeas} - (Q_{qualmin} + Q_{qualminoffset}) - Q_{unusable\_offset2} > 0 \quad \text{[Equation 4]}$$

Figure 7:
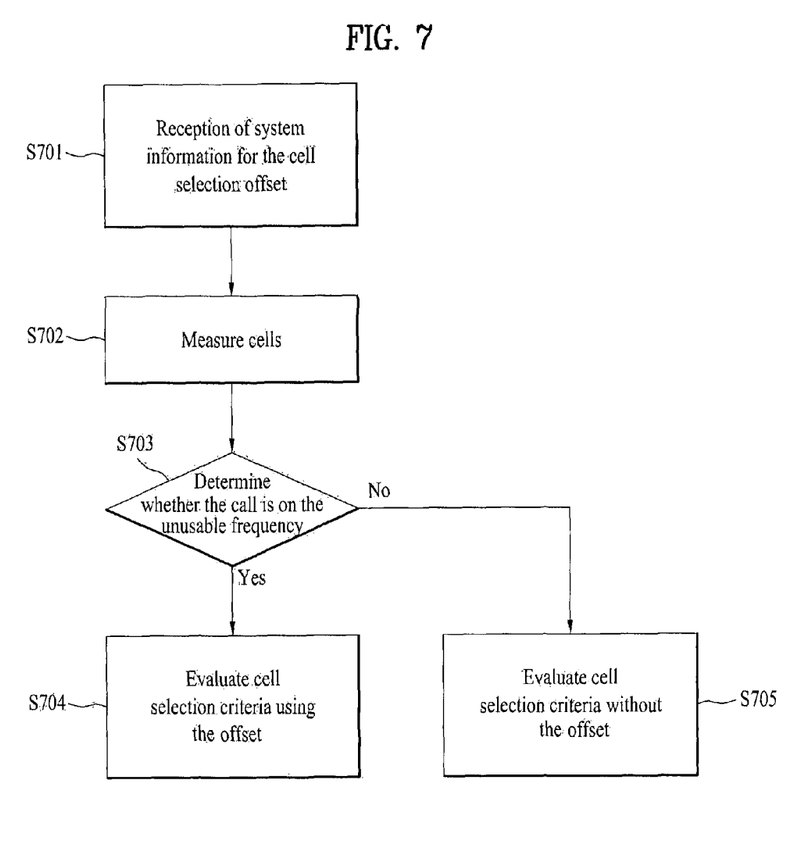
FIG. 7 is an exemplary flowchart for a cell selection procedure according to embodiment of the present invention.

FIG. 7 is an exemplary flowchart for a cell selection procedure according to embodiment of the present invention. In particular, FIG. 7 indicates a cell selection procedure based on whether IDC interference of a user equipment in RRC_IDLE state exists or not.

Referring to FIG. 7, the user equipment in RRC_IDLE state receives an offset value for a cell selection via broadcasting information [S701]. In this case, the offset value for Srxlev is $Q_{unusable\_offset1}$ and the offset value for Squal is $Q_{unusable\_offset2}$.

The user equipment performs a cell measurement for a cell selection [S702]. If there exists a stored information, the user equipment measures for cells on a stored frequency. If there is no stored information, the user equipment measures for all cells on E-UTRA band. The user equipment judges whether a measured cell is the cell on the unusable frequency on which IDC interference occurs.

If the measured cell corresponds to the cell on the unusable frequency, the user equipment evaluates whether the cell measured according to Equation 3 and Equation 4 satisfies a cell selection condition using the received offset values $Q_{unusable\_offset1}$ and $Q_{unusable\_offset2}$.

On the contrary, if the measured cell is not the cell on the unusable frequency, the user equipment evaluates whether the cell measured according to Equation 1 and Equation 2 satisfies the cell selection condition without using the received offset value [S705].

According to the embodiment of the present invention, the user equipment may be able to avoid selecting a cell on the frequency at which the IDC interference occurred in the cell selection process. Moreover, the user equipment in RRC_IDLE state may be able to establish an RRC connection in a manner of quickly searching for a cell. And, the user equipment in RRC_CONNECTED state may be able to quickly recover the RRC connection to a network.

Figure 8:
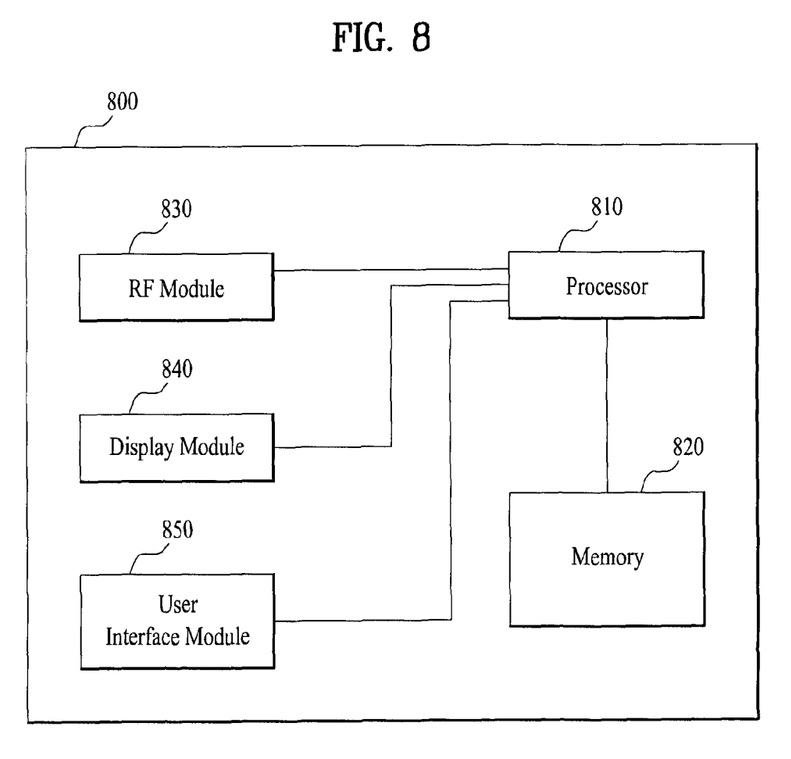
FIG. 8 is an exemplary block diagram for a communication transceiver according to one embodiment of the present invention.

FIG. 8 is an exemplary block diagram for a communication transceiver according to one embodiment of the present invention. The transceiver may be an eNode B or a part of a user equipment.

Referring to FIG. 8, the transceiver 800 includes a processor 810, a memory 820, an RF module 830, a display module 840, and a user interface module 850.

Since the transceiver 800 is depicted for clarity of description, prescribed module(s) may be omitted in part. The transceiver 800 may further include necessary module(s). And, a prescribed module of the transceiver 800 may be divided into subdivided modules. A processor 810 is configured to perform an operation with reference to the former contents described in FIG. 1 to FIG. 7.

The memory 820 is connected with the processor 810 and stores an operating system, applications, program codes, data, and the like. The RF module 830 is connected with the processor 810 and then performs a function of converting a baseband signal to a radio signal or a function of converting a radio signal to a baseband signal. To this end, the RF module 830 performs an analog conversion, amplification, a filtering, and a frequency up conversion, or performs processes inverse to the former processes. The display module 840 is connected with the processor 810 and displays various kinds of informations. And, the display unit 840 can be implemented using such a well-known component as an LCD (liquid crystal display), an LED (light emitting diode), an OLED (organic light emitting diode) display and the like, by which the present invention may be non-limited. The user interface module 850 is connected with the processor 810 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this specification, embodiments of the present invention are described centering on the data transmission/reception relations between a user equipment and an eNode B. In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like. And, a terminal may be substituted with such a terminology as a user equipment (UE), a mobile station (MS), a mobile subscriber station (MSS), and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of selecting a cell in a wireless communication system and apparatus therefor are described with reference to examples applied to 3GPP LTE system, it may be applicable to various kinds of wireless communication systems as well as the 3GPP LTE system.

The invention claimed is:

1. A method of performing a cell selection at a first communication module of a user equipment in a wireless communication system, comprising:
    receiving offset information from a network;
    measuring a cell for the cell selection; and
    determining whether to select the measured cell by applying the offset information to a measurement result, if a frequency on the measured cell is an unusable frequency.

2. The method of claim 1, further comprising determining whether to select the measured cell by not applying the offset information to the measurement result, if the frequency on the measured cell is not the unusable frequency.

3. The method of claim 1, further comprising establishing a connection with the measured cell, if the measured cell is selected.

4. The method of claim 1, wherein the unusable frequency is a frequency occurring an IDC (In-Device Coexistence) interference due to one or more second communication modules coexisting in the user equipment.

5. The method of claim 4, wherein the one or more second communication modules comprise at least one of a transceiving module for a WiFi system, a transceiving module for a Bluetooth and a receiving module for a GPS (Global positioning System).

6. The method of claim 1, wherein the offset information includes an offset value to subtract from the measurement result.

7. The method of claim 6, wherein determining whether to select the measured cell comprises selecting the measured cell if a value of subtracting the offset value from the measurement result is greater than 0.

8. The method of claim 1, wherein the measurement result includes at least one of a reception power level for the cell selection and a cell quality value for the cell selection.

9. The method of claim 2, further comprising establishing a connection with the measured cell, if the measured cell is selected.

* * * * *